United States Patent
Cabib et al.

(10) Patent No.: US 9,121,760 B2
(45) Date of Patent: Sep. 1, 2015

(54) ROOM-TEMPERATURE FILTERING FOR PASSIVE INFRARED IMAGING

(75) Inventors: Dario Cabib, Timrat (IL); Moshe Lavi, Nofit (IL); Ziv Attar, Zikron Yaakov (IL)

(73) Assignee: CI SYSTEMS LTD., Migdal Haemek (IL)

(*) Notice: Subject to any disclaimer, the term of this patent is extended or adjusted under 35 U.S.C. 154(b) by 875 days.

(21) Appl. No.: 12/853,319

(22) Filed: Aug. 10, 2010

(65) Prior Publication Data

US 2011/0181730 A1  Jul. 28, 2011

Related U.S. Application Data

(60) Provisional application No. 61/298,569, filed on Jan. 27, 2010.

(51) Int. Cl.

| | | |
|---|---|---|
| *H04N 5/33* | (2006.01) | |
| *G01J 5/06* | (2006.01) | |
| *G01J 5/08* | (2006.01) | |
| *G01J 5/60* | (2006.01) | |
| *H04N 5/217* | (2011.01) | |
| *H04N 5/225* | (2006.01) | |
| *G01J 5/00* | (2006.01) | |

(52) U.S. Cl.
CPC .. *G01J 5/06* (2013.01); *G01J 5/061* (2013.01); *G01J 5/08* (2013.01); *G01J 5/0806* (2013.01); *G01J 5/0862* (2013.01); *G01J 5/602* (2013.01); *H04N 5/217* (2013.01); *H04N 5/2254* (2013.01); *H04N 5/33* (2013.01); *G01J 2005/0077* (2013.01)

(58) Field of Classification Search
CPC ...... H04N 5/33; G01J 5/06; G01J 2005/0077; G01J 3/2823
USPC ............ 348/164; 356/416–419; 250/338–371
See application file for complete search history.

(56) References Cited

U.S. PATENT DOCUMENTS

| | | | | |
|---|---|---|---|---|
| 3,770,958 | A * | 11/1973 | Krakow | 250/339.01 |
| 4,420,688 | A * | 12/1983 | Le Bars | 250/352 |
| 4,783,593 | A * | 11/1988 | Noble | 250/352 |
| 4,937,450 | A | 6/1990 | Wakabayashi et al. | |
| 5,090,807 | A * | 2/1992 | Tai | 356/310 |
| 5,250,980 | A * | 10/1993 | Yakubo et al. | 355/32 |
| 5,408,100 | A * | 4/1995 | Gallivan | 250/352 |
| 5,434,413 | A | 7/1995 | Kennedy | |
| 5,629,520 | A * | 5/1997 | Sonstroem | 250/330 |
| 5,796,514 | A * | 8/1998 | Chipper | 359/354 |

(Continued)

FOREIGN PATENT DOCUMENTS

| | | |
|---|---|---|
| DE | DE202004007140 | 7/2004 |
| DE | 102007051893 | 5/2009 |
| FR | 2137523 | 12/1972 |

*Primary Examiner* — Christopher S Kelley
*Assistant Examiner* — Deirdre Beasley
(74) *Attorney, Agent, or Firm* — Mark M. Friedman

(57) ABSTRACT

A device, for imaging infrared radiation from a scene, includes a detector of the infrared radiation, an enclosure for keeping the detector at an operating temperature thereof, an optical system, outside the enclosure, for focusing the infrared radiation onto the detector via a window of the enclosure, and a filter. In one embodiment, the filter is positioned at an intermediate focal plane of the optical system. In another embodiment, the filter is on a surface of an optical element of the optical system and has a defocusing relationship to the detector.

19 Claims, 6 Drawing Sheets

(56) References Cited

U.S. PATENT DOCUMENTS

| | | | |
|---|---|---|---|
| 6,101,034 A * | 8/2000 | Cox et al. | 359/562 |
| 6,444,984 B1 * | 9/2002 | Lundgren et al. | 250/339.03 |
| 7,508,966 B2 * | 3/2009 | Rao et al. | 382/128 |
| 7,649,626 B2 * | 1/2010 | Harvey et al. | 356/326 |
| 8,159,596 B2 * | 4/2012 | Yamano | 348/342 |
| 8,223,206 B2 * | 7/2012 | Cromwell et al. | 348/164 |
| 2002/0043623 A1 * | 4/2002 | Galloway | 250/339.02 |
| 2004/0220458 A1 * | 11/2004 | Burd et al. | 600/310 |
| 2005/0174573 A1 * | 8/2005 | Harvey et al. | 356/328 |
| 2006/0164640 A1 * | 7/2006 | Treado et al. | 356/326 |
| 2008/0100910 A1 * | 5/2008 | Kim et al. | 359/356 |
| 2008/0210870 A1 * | 9/2008 | Remillard et al. | 250/330 |
| 2008/0231719 A1 * | 9/2008 | Benson et al. | 348/222.1 |
| 2009/0116009 A1 * | 5/2009 | Nelson et al. | 356/326 |
| 2009/0141343 A1 * | 6/2009 | Leard | 359/359 |
| 2009/0278918 A1 * | 11/2009 | Marcus et al. | 348/54 |
| 2010/0163710 A1 * | 7/2010 | Oldham et al. | 250/208.1 |
| 2011/0007204 A1 * | 1/2011 | Yamano | 348/362 |
| 2011/0169962 A1 * | 7/2011 | Gat et al. | 348/164 |
| 2011/0177562 A1 * | 7/2011 | Vann et al. | 435/91.2 |
| 2012/0280144 A1 * | 11/2012 | Guilfoyle et al. | 250/458.1 |

* cited by examiner

ROOM-TEMPERATURE FILTERING FOR PASSIVE INFRARED IMAGING

This is a continuation-in-part of U.S. Provisional Patent Application No. 61/298,569, filed Jan. 27, 2010

FIELD AND BACKGROUND OF THE INVENTION

The present invention relates to the detection and imaging of infrared radiation and, more particularly, to a device, for detecting and imaging infrared radiation, that facilitates the alternation among several uncooled filters in conjunction with a cooled detector of the infrared radiation.

It is well known in the art of thermal imaging infrared sensors based on cooled detector arrays that in order not to flood the detector with unwanted spurious self-emission from the environment two design elements must be present in the system: i) the collecting optics (lenses or mirrors, filters and windows) must be made of non-absorbing infrared transmitting materials in the wavelength range of sensitivity of the detector (so as not to emit appreciable amounts of infrared radiation introducing noise and masking the radiation to be detected), and ii) the entrance pupil of the collecting optics must be imaged on a cold shield aperture present in the cryogenically cooled space inside the detector Dewar, again in order to avoid radiation from the environment to introduce noise and spurious signals. These design rules are necessary because the optical elements, the optics housing of the system as well as the environment emit a large amount of radiation in the infrared range which in general masks the radiation to be detected and originating in the scene to be analyzed. However in many cases and situations, in addition to the imaging optics and windows, there is the need to use a number of spectral filters placed alternately on the optical train in the sensor system, in order to detect and identify and recognize different sources placed in the field of view of the system. These filters may be narrow-band, wide-band, cut-on, cut-off or otherwise spectrally limiting the incoming radiation from the scene, so that these objects can be detected and identified based on their spectral characteristics.

As a result, since a spectral filter may be a source of self-emitted infrared radiation in its own right and may reflect environment radiation into the detector if simply placed in the collection optics train, the common knowledge and practiced art is to place the filter inside the Dewar so as to be cooled to cryogenic temperatures: this insures minimizing the self-emission of the filter and preventing the filter from introducing spurious radiation into the detector. The main disadvantage of this filter cooling method is that once the filter is built into the Dewar it cannot be exchanged for a different one, preventing the possibility of acquiring different successive images of the scene to be analyzed through different narrow wavelengths or through different spectral ranges so that the spectral capability of the system is very limited.

The purpose of the present invention is to provide infrared sensor systems with the advantages of the prior art systems that use cooled detectors and a cooled filter but with the significant advantages of: i) enhanced spectral capability by being able to use a succession of spectral filters or a continuously variable filter (CVF) or a different type of filter plurality, ii) avoidance of cooling the filters, which results in a simpler and less expensive system.

As it is taught in U.S. Pat. No. 5,434,413 to Kennedy, optical filtering in prior art systems based on cooled photon array detectors can be done for example in the following two ways: i) by placing the filter in direct contact with the cooled detector (see Kennedy FIGS. 1b and 1d) so that the filter itself is cooled and its self-emission is very small, and as a consequence its contribution to signal and background noise is minimized; ii) by placing a bandpass filter coating on the vacuum window (see Kennedy FIG. 2), this window being constructed of a non-absorbing material (see Kennedy, end of column 3): the fact that the window is made of non-absorbing material insures here too that the self-emission of the window and as a consequence its contribution to background noise is minimized even if the window is not cooled. In both configurations of the prior art of Kennedy the filter is constructed as a physical part of the vacuum vessel or Dewar, either inside the vessel or being coated or attached on its window. Both these configurations have the following disadvantages (besides the ones mentioned in that patent for the former configuration).

A) These configurations do not allow the use of more than one filter in the system in succession for image detection in more than one spectral range or more than one wavelength (this being the spectral range or the coating of Kennedy FIGS. 1d and 2): in this case, for example, when more than one narrow band signal is needed from each pixel of the image to be measured the filters must be used outside the Dewar on the optical train of the telescope and therefore in general, absent the special innovative improvements of the present invention as described below, the filters will have to be enclosed in an additional vacuum vessel and be cooled in order to avoid their own self-emission.

B) Even with this additional cooling of the filters, reflection of background radiation towards the detector in the unwanted noise contributing spectral range cannot in general be avoided.

C) The filter configuration inside the Dewar of Kennedy FIGS. 1b and 1d usually requires special work from the detector manufacturers because the filter, being application dependent, is not standard and as a consequence a very high price is paid for the Dewar and detector construction.

U.S. Pat. No. 3,770,958 to Krakow teaches the use of a single filter and the use of a series of interchangeable non-emitting uncooled filters placed in front of the Dewar window in a system using a single or multiple stacked detectors (not an imaging array). It is not obvious that such arrangement can be easily extended to the case of imaging array detectors. In fact, in the case of the single filter often there is to not enough physical space in front of the window for the filter to be close enough to the Dewar window so that the edge of the array will not receive spurious radiation from the surroundings. The case of a rotating multiple filter wheel in that patent requires a lens to be placed inside the Dewar to be cooled: this is a very expensive and cumbersome proposition.

U.S. Pat. No. 5,408,100 to Gallivan teaches an uncooled non-emitting filter that is a multilayer coating, on the last spherical concave surface of a lens in the optical system, whose radius of curvature is equal to the distance of the surface to the detector. This arrangement produces in general an unwanted ghost image of the array pixels superimposed on the desired image provided by the system due to the fact that the pixels and the surface separating them usually have different reflectivity.

It would be highly advantageous to be able to use more than one filter in the same system for comparison of signals from different spectral ranges and to use a standard infrared cooled-array-camera-based sensor system without an expensive and cumbersome cooling system needed for any of these filters or lenses and with minimal loss of signal to noise ratio or dynamic range in spite of the filters not being cooled.

SUMMARY OF THE INVENTION

According to the present invention there is provided a device for imaging infrared radiation from a scene, including: (a) a detector of the infrared radiation; (b) an enclosure, for keeping the detector at an operating temperature thereof, and including a window that is transparent to the infrared radiation; (c) an optical system, outside of the enclosure, for focusing the infrared radiation through the window onto the detector; (d) a filter; and (e) a mechanism for positioning the filter substantially at an intermediate focal plane of the optical system.

According to the present invention there is provided a device for imaging infrared radiation from a scene, including: (a) a detector of the infrared radiation; (b) an enclosure, for keeping the detector at an operating temperature thereof, and including a window that is transparent to the infrared radiation; and (c) an optical system, outside of the enclosure, for focusing the infrared radiation through the window onto the detector, and including: (i) at least one optical element, and (ii) on a surface of one of the at least one optical element, a filter having a defocusing relationship to the detector.

One basic embodiment, of a device for imaging infrared radiation from a scene, include a detector of the infrared radiation, an enclosure, an optical system outside the enclosure, a filter (that in almost all cases is nonabsorbing in the spectral range of the detector), and a mechanism for positioning the filter at or near an intermediate focal plane of the optical system. The enclosure is for keeping the detector at its operating temperature, which normally is lower than both the ambient temperature of the environment of the device and the temperature of the scene. For example, if the detector is a photon detector, the detector must be kept at cryogenic temperatures in order to work. The enclosure includes a window that is transparent to the infrared radiation. The optical system is for focusing the infrared radiation through the window onto the detector.

Preferably, the filter has a negligible emissivity at wavelengths to which the detector is sensitive. The term "negligible" is application-dependent, and means that the radiation emitted by the filter at wavelengths to which the detector is sensitive does not interfere with the use of the device of the present invention for that particular application. Most preferably, the filter is an interference filter. The filter could be for example, a high pass filter, a low pass filter, a band pass filter, or a band reject filter, depending on the desired application. Alternatively, the filter could be a circular variable filter or a linearly variable filter.

In some embodiments, the mechanism for positioning the filter at the intermediate focal plane of the optical system keeps the filter fixed in place at the intermediate focal plane. In other embodiments, the device includes a plurality of filters and the mechanism for positioning the filters at the intermediate focal plane of the optical system is a mechanism such as the filter wheel illustrated below that is operative to alternately and reversibly position each of the filters at the intermediate focal plane.

Preferably, the device includes one or more baffles for shielding the detector from stray radiation.

Normally, the detector includes a plurality of detector elements. In the preferred embodiments described below, the detector is an array of such detector elements.

Preferably, the optical system is telecentric, with respect to the image space of the optical system, at the intermediate focal plane.

Another basic embodiment, of a device for imaging infrared radiation from a scene, includes a detector of the infrared radiation, an enclosure, and an optical system outside the enclosure. The enclosure is for keeping the detector at its operating temperature, which normally is lower than both the ambient temperature of the environment of the device and the temperature of the scene. For example, if the detector is a photon detector, the detector must be kept at cryogenic temperatures in order to work. The enclosure includes a window that is transparent to the infrared radiation. The optical system is for focusing the infrared radiation through the window onto the detector. The optical system includes one or more optical elements. The optical element(s) could be refractive (e.g., lenses), reflective (e.g., mirrors), diffractive (e.g., diffraction gratings), or Fresnel-type optical elements. On a surface of (one of the) optical element(s) there is a filter that has a defocusing relationship to the detector. By a "defocusing relationship" is meant that light that is emitted by the detector and reflected by the filter back to the detector is sufficiently defocused that the reflection is not perceived as a ghost image on the image of the scene. In general, the filter does not have to be very far from the intermediate focal plane of the optical system to achieve sufficient defocusing.

Preferably, the filter has a negligible (as defined above) emissivity at wavelengths to which the detector is sensitive. Most preferably, the filter is an interference filter. The filter could be for example, a high pass filter, a low pass filter, a band pass filter, or a band reject filter, depending on the desired application.

Preferably, the device includes one or more baffles for shielding the detector from stray radiation.

Normally, the detector includes a plurality of detector elements. In the preferred embodiments described below, the detector is an array of such detector elements.

Preferably, if there is more than one optical element, the optical element that has the filter on its surface is the closest optical element to the window. More preferably, the surface on which the filter is located is the closest surface of the optical element to the window. Most preferably, the device also includes a cold shield, within the enclosure, between the window and the detector. The surface on which the filter is located is concave toward the window and has a radius of curvature substantially equal to the distance of the surface from an aperture of the cold shield.

Preferably, the filter is spaced apart from the window.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
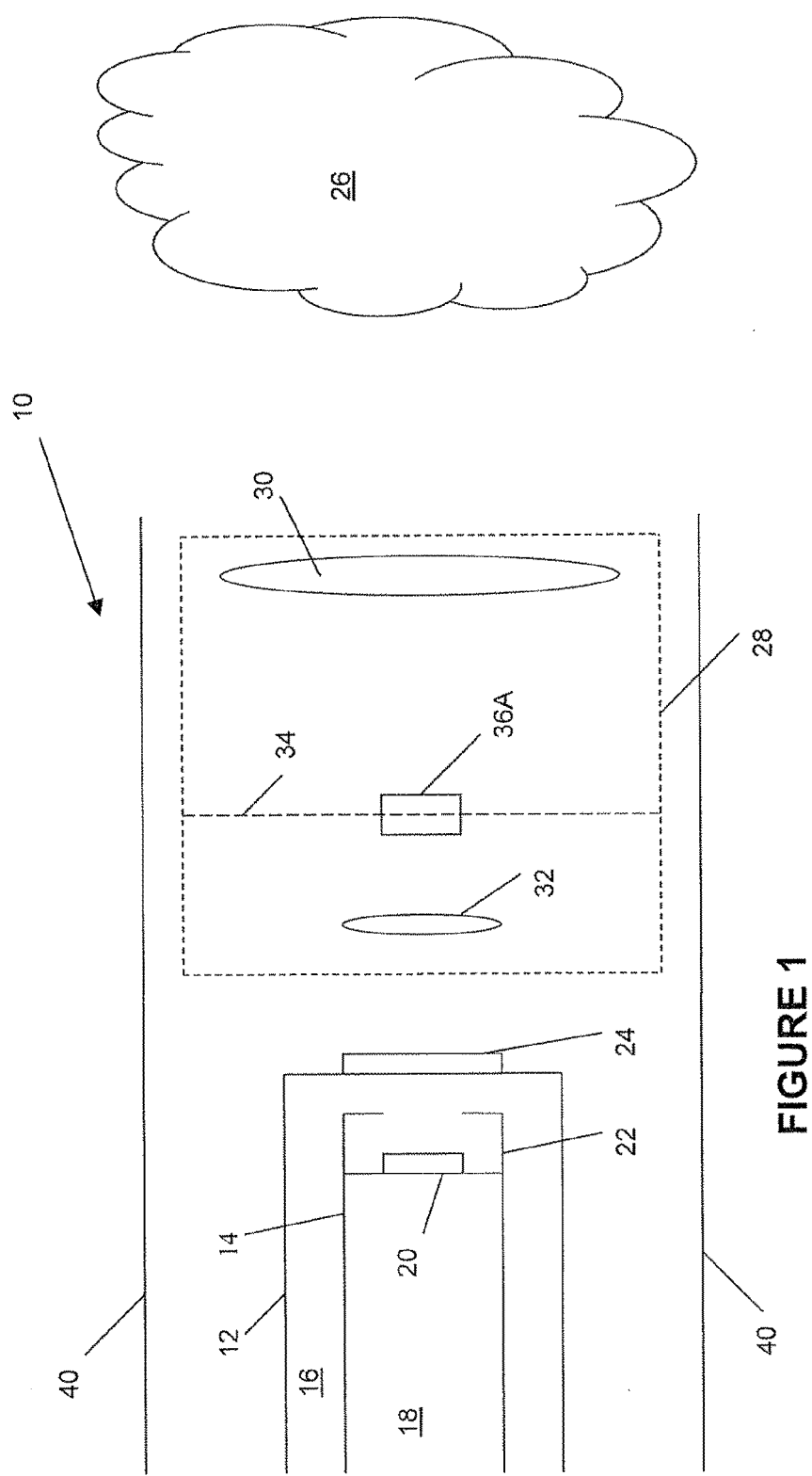
FIG. 1 shows a first embodiment of a device of the present invention.

The principles and operation of a device for detecting and imaging infrared radiation according to the present invention may be better understood with reference to the drawings and the accompanying description.

The present invention is specifically directed to a new way of successively filtering spectral ranges of detected infrared radiation that avoids cooling the filters themselves, and at the same time does not lose appreciably the low noise advantage given by this cooling and adds the advantage of easily scanning through different wavelengths of filtering in a compact and less expensive fashion than in the prior art.

The traditional stand-off detection and identification of objects exhibiting narrow spectral absorption features in the infrared region of the spectrum are done by instrumentation which is capable of sensing either spectral radiation intensity as function of wavelength in a wide spectral range, or material specific radiation selected by a specific spectral filter in a narrow characteristic region of the spectrum appropriate for that material. This is so because the functional shape of this wavelength dependent radiation intensity is directly related to the specific spectral characteristics of the material and to its chemical composition and can be used for its detection, recognition or identification and imaging. In contrast, an instrument without a spectral capability, such as an infrared radiometric camera, measuring or displaying only the integral of the radiation emitted by a scene within a whole spectral range, cannot distinguish between different compositions or types of materials, because in this case the signal is only correlated to the temperature and average emissivity of the material in question, and does not yield material-specific information.

Therefore, it would be desirable to have an infrared optical detection system with an infrared cooled detector array which is capable of imaging infrared radiation emitted by objects to be identified and located by detecting and comparing the objects' spectral features or emissions in different spectral narrow wavelength bands in a relatively simple and inexpensive opto-mechanical configuration.

Many types of radiation measuring instrumentation have been developed and sold for this purpose for many years, with partial or full spectral capability. Some types of instrumentation are quite complex in their design and manufacturing due to the need for means of optically dispersing (by way of prisms, gratings, etc. subsystems) or interferometrically handling (by way of an interferometer) the measured radiation interacting with the object to be detected. This fact makes this type of instrument usually large, heavy and expensive. Simpler instrumentation is based on spectrally specific radiation filtering; this requires that the filter be cooled to cryogenic temperatures in case this filtering is done by full or partial absorption of the radiation being filtered and the filter placed in the Dewar right in front of the detector; otherwise the detector may be flooded by a large unspecific signal due to the filter's own infrared self emission or originated by the environment and reflected by the filter, making it impossible for the sought-after signal to be detected. This need for cooling the filter complicates the design and implementation of the instrument.

According to the present invention the detection and imaging of a specific material (such as a gas cloud or terrain in geological analysis or other infrared spectrally active material) from a distance is done with an array-based infrared camera combined with material-specific filtered optics, avoiding the cooling of the filter and at the same time providing either a partial or full spectral capability for single or multiple material identification without losing most of the noise reduction advantage of the filter cooling. The solution is provided by several elements: i) any filter in the system is designed in such a way that in the wavelength range of sensitivity of the detector the filter barely absorbs any radiation, for minimum self-emission, ii) an optical design of the system that insures that the only spurious radiation reaching the detector in addition to the specifically filtered radiation from the object to be studied is radiation originating from the cooled region of the detector itself or from a cold region within the Dewar, therefore being negligible; this can be achieved, for example, with a non-absorbing filter on a non-absorbing substrate (single or multiple on a rotating filter wheel, or a continuously circular variable spectral filter, so called. CVF, or linearly variable spectral filter, so called LVF) placed in or near an intermediate image plane of the collecting optics and combined with relay optics to image the intermediate image plane on the detector array, or with a non-absorbing filter coating on a concave spherical lens surface (also usually combined with additional optics for imaging on the detector array) placed at a distance from the cold shield equal to the radius of curvature of this surface; and iii) a cooled detector-array-based infrared camera: in fact, the self-emission of the array is negligible in this case because it is cooled and therefore it may be used as background to the signals to be detected without appreciably contributing to those signals and to background noise. Reflecting baffles may be necessary to prevent residual stray radiation from reaching the detector.

A system of the present invention, for sensing infrared signals in a single or a plurality of specific narrow spectral regions of the infrared spectrum in succession, is designed so that almost all the signal recorded by the detector is only from two possible sources: the object-specific self-emission to be identified in the wavelength range(s) of transmission of the filter or filters (allowing identification), and a very small signal emitted by the cooled detector or cold region within the Dewar as background with no other or almost no other spurious contribution from the environment.

Referring now to the drawings, FIG. 1 shows a first embodiment 10 of a device for imaging a scene 26, such as a gas cloud, in the infrared region of the electromagnetic spectrum. The imaging itself is done by a photon detector array 20 that is cooled by the conventional method of being mounted on a cold finger 14 inside a Dewar 12. Cooling is provided by a cryogenic fluid 18 such as liquid nitrogen inside cold finger 14. Detector array 20 is insulated thermally from the outside environment of device 10 by the vacuum 16 of Dewar 12. Detector array 20 is further shielded from stray infrared radiation by a cold shield 22 that is cooled by thermal contact with cold finger 14. Infrared radiation from scene 26 is focused on detector array 20 through a window 24 by a telescope 28 whose optical components are represented symbolically in FIG. 1 by lenses 30 and 32. (Each of "lenses" 30 and 32 actually is a set of one or more lenses that is represented in FIG. 1 by a single lens.) Window 24 and optical components 30 and 32 are made of materials, such as germanium, zinc sulfide or zinc selenide, that is transparent in the infrared. The surfaces of window 24 and optical components 30 and 32 are coated with antireflection coatings.

For clarity of illustration, the image acquisition electronics associated with detector array 20 are not shown in FIG. 1.

A filter 36A is positioned in the optical path of telescope 28 at or near an intermediate focal plane 34 of telescope 28 so that all the rays from scene 26 that are focused on detector array 20 by telescope 28 pass through filter 36A.

Figure 2:
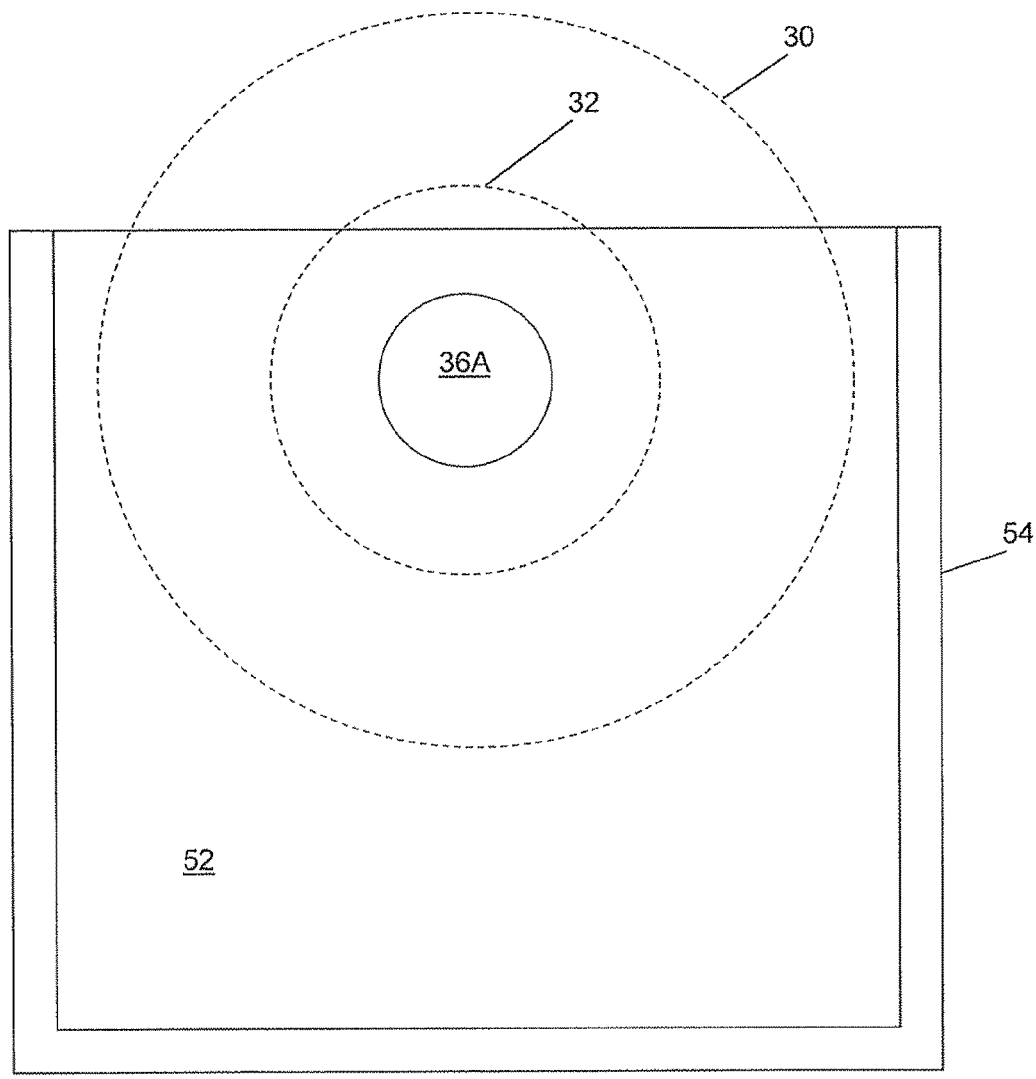
FIG. 2 shows a filter mounted on a holder and inserted in a bracket at the intermediate focal plane of the device of FIG. 1.

FIG. 2 shows one way of positioning filter 36A in the optical path of telescope 28 at intermediate focal plane 34.

Device 10 is provided with a bracket 54 for holding a rectangular holder 52, in which filter 36A is mounted, substantially coincident with intermediate focal plane 34. The positions of lenses 30 and 32 relative to holder 52, when holder 52 is inserted into bracket 54 with filter 36A in the optical path of telescope 28 as shown in FIG. 1, are shown in FIG. 2 in phantom. As long as card 52 is mounted inside bracket 54 as shown, filter 36A is fixed in place in the optical path of telescope 28 at intermediate focal plane 34. Similar holders, having mounted therein other filters 36B, 36C, 36D, etc., are also provided, so that filter 36A can be swapped for the other filters, for example for detection of a gas by comparison of images at different wavelengths or for identification of different materials with different spectral features.

Figure 3:
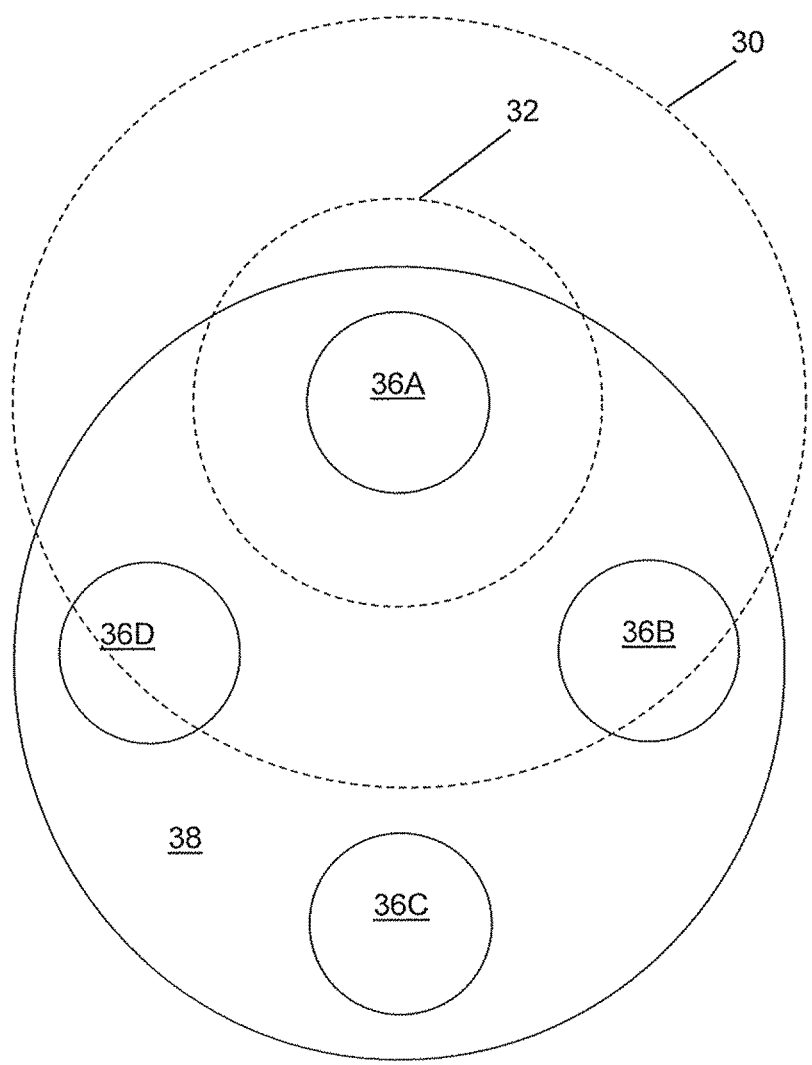
FIG. 3 shows a filter wheel for use in conjunction with the device of FIG. 1.

FIG. 3 shows another way of positioning filter 36A in the optical path of telescope 28 at intermediate focal plane 34. In FIG. 3, filter 36A is one of four filters 36A, 36B, 36C and 36D that are mounted on a filter wheel 38. Filter wheel 38 is mounted in device 10 substantially coincident with intermediate focal plane 34 and is rotated about its center to position one of filters 36A, 36B, 36C or 36D, as desired, in the optical path of telescope 28. The positions of lenses 30 and 32 relative to filter wheel 38, when filter 36A is in the optical path of telescope 28 as shown in FIG. 1, are shown in FIG. 3 in phantom. That filter wheel 38 includes only four filters 36 is only for illustrational clarity. Filter wheel 38 may include as many filters as is convenient, for example for detection of a gas by comparison of images at different wavelengths or for identification of different materials with different spectral features.

Alternatively, the filter that is positioned in the optical path of telescope 28 at intermediate focal plane 34 is a circular variable filter having a continuously variable transmitted wavelength around its circumference or a linearly variable filter having a continuously variable transmitted wavelength along one of its dimensions perpendicular to the optical path of telescope 28.

All the filters of the preferred embodiments are filters such as interference filters that do not appreciably absorb and emit radiation within the spectral window of to sensitivity of detector array 20.

Figure 4:
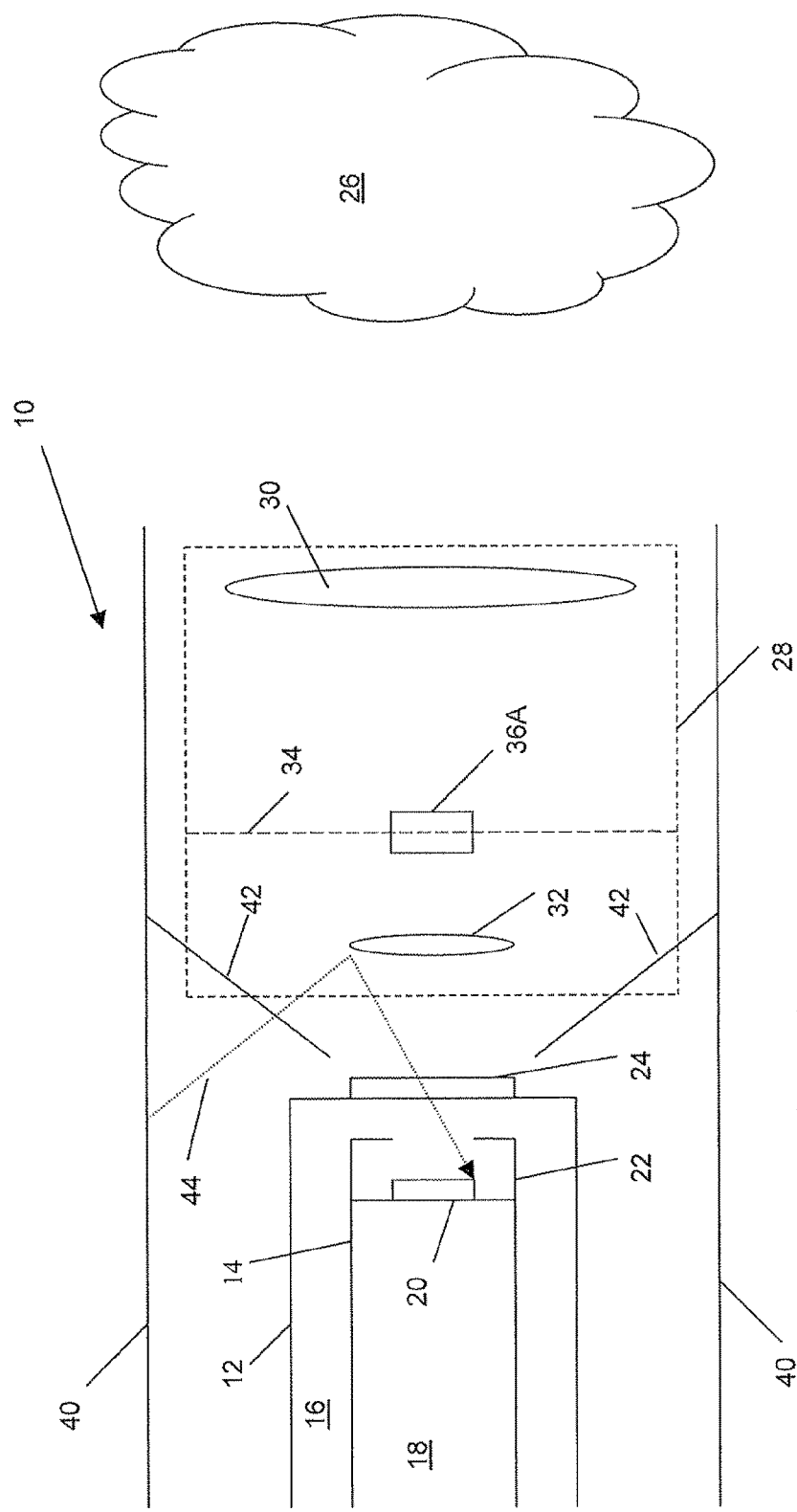
FIG. 4 shows a variant of the device of FIG. 1 that includes a baffle for blocking stray radiation.

FIG. 4 shows a variant of the embodiment of FIG. 1 in which a baffle 42 has been added to keep infrared radiation that originates in the environment of device 10 from reaching detector array 20. The example of such self-emission that is shown in FIG. 4 is a ray 44 from one of the internal walls 40 of device 10. Baffle 42 is a highly reflective mirror on the side that faces telescope 28, and in this example is shaped like the frustum of a cone, with an aperture in its center. A baffle such as baffle 42 that prevents stray radiation from reaching detector array 20 is more important for the detector elements near the edges of detector array 20 than for the detector elements towards the middle of detector array 20.

Alternately or additionally, spurious radiation is prevented from reaching detector array 20 by configuring telescope 28 with optics that are telecentric with respect to the image space of telescope 28 at intermediate focal plane 34 so that the central rays from scene 26 are perpendicular to filter 36A. Such a telecentric arrangement is equally beneficial for both the detector elements near the edges of detector array 20 and the detector elements towards the middle of detector array 20.

Figure 5:
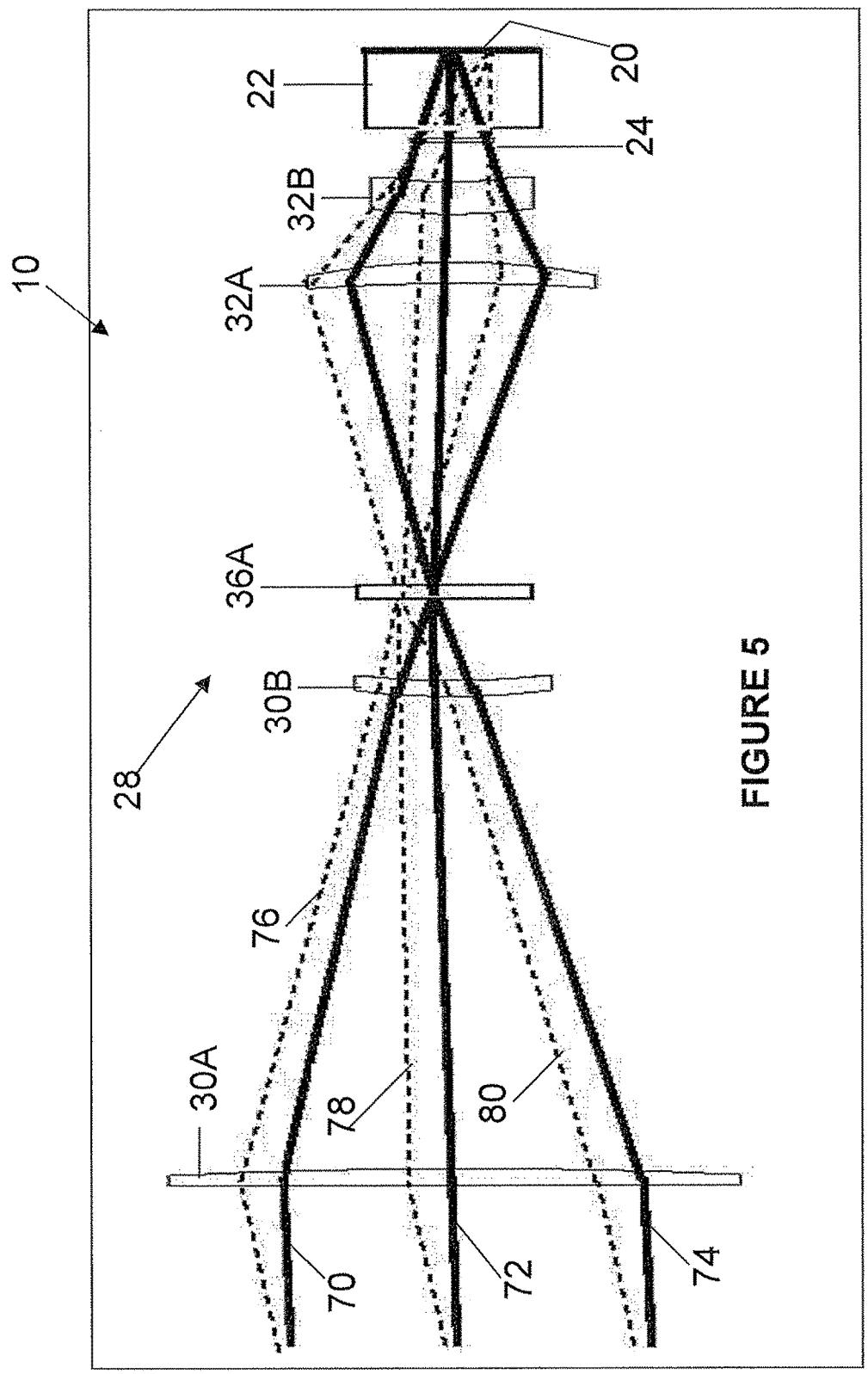
FIG. 5 shows a telecentric variant of the device of FIG. 1.

FIG. 5 illustrates such a telecentric variant 10' of embodiment 10, with two objective lenses 30A and 30B and two relay lenses 32A and 32B in telescope 28. Rays 70, 72 and 74 from the center of a distant scene are focused on the center of detector array 20. Rays 76, 78 and 80 from one side of the scene are focused towards an edge of detector array 20. The central rays, rays 72 and 78, are perpendicular to filter 36A. Such a design guarantees that while all the light from the scene that traverses filter 36A is focused onto detector array 20 any other light reflected by filter 36A towards detector array 20 is negligible because that light originates in a cold region, i.e., the region near the detector itself, which region is kept chilled by cryogenic fluid 18 of FIG. 1.

The baffles of FIG. 4 and the telecentric arrangement of FIG. 5 minimize the light that is reflected by filter 36A towards detector array 20. Such reflected light is the principal contribution to stray light because filter 36A, being highly reflective for all wavelengths except the wavelengths for which filter 36A is highly transmissive, acts as a mirror for those wavelengths and may easily direct a large number of unwanted photons from the environment of device 10 to detector array 20. The other components in the optical train, such as lenses 30 and 32, are coated with antireflection coatings for the same purpose.

Figure 6:
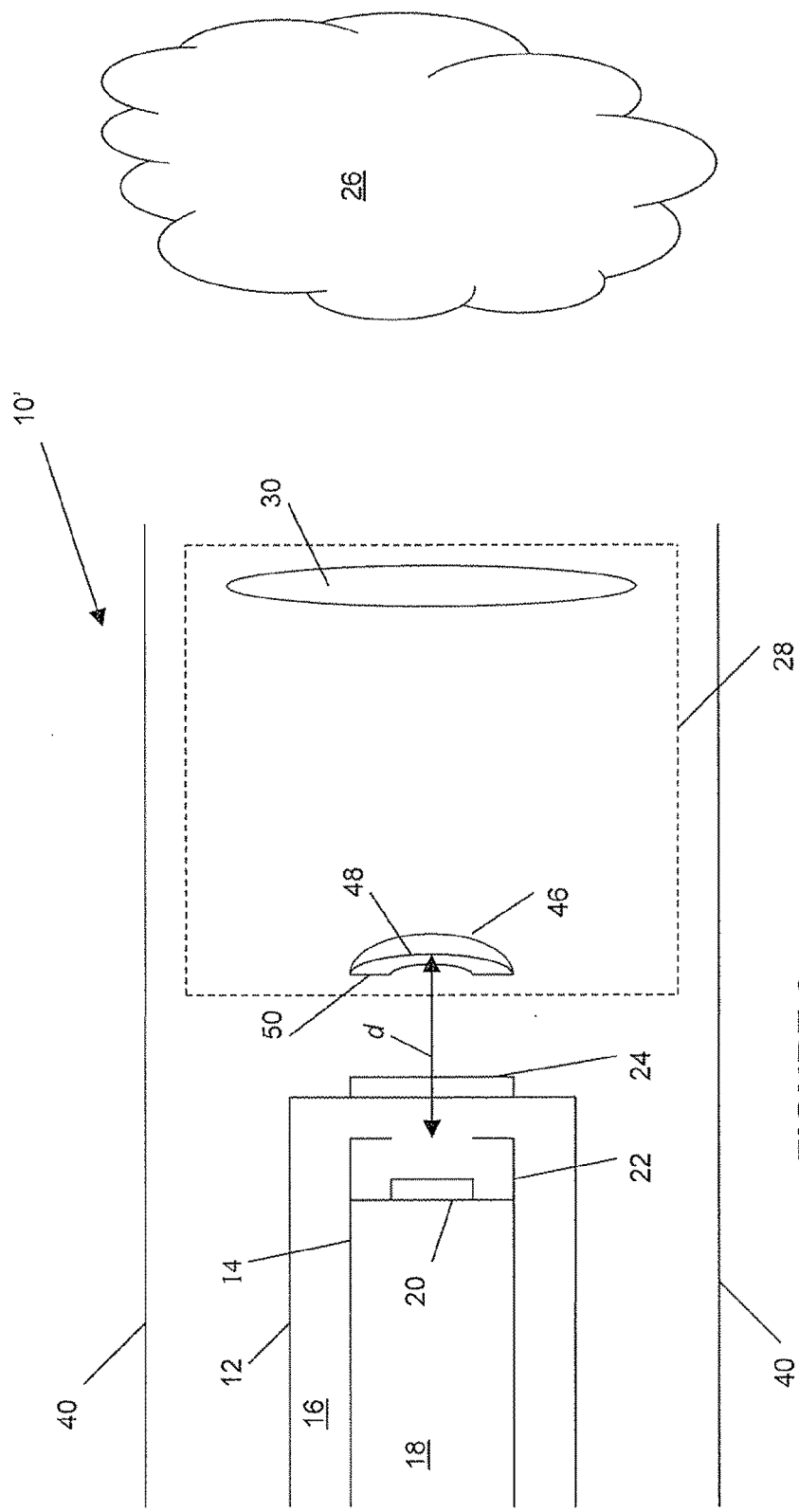
FIG. 6 shows a second embodiment of a device of the present invention.

FIG. 6 shows a second embodiment 10' of a device for imaging scene 26. Embodiment 10' is similar to embodiment 10 except that in telescope 28 lens 32 has been replaced with a set 46 of one or more lenses whose surface 48 closest to detector array 20 is concave towards detector array 20. Here, the filter is not a separate optical element from the focusing optics of telescope 28 but rather a non-absorbing coating 50 on surface 48. For clarity of illustration, the thickness of coating 50 is greatly exaggerated in FIG. 6. The radius of curvature of surface 48, and so of coating 50, is equal to the distance d between surface 48 and the aperture of cold shield 22 along the optical axis of telescope 28. In this case there is no need for the optics of telescope 28 to include an intermediate focal plane, but the successive detection of the radiation through a plurality of filters is possible only by replacing lens set 46, or at least by replacing the lens of set 46 closest to detector array 20, which is a more cumbersome method than the methods used with the embodiments of FIGS. 1-5.

The advantage of having cold shield 22 being imaged by surface 48 and filter 50 onto cold shield 22 itself, rather than onto detector array 20 as in the device of Gallivan, is that the design of FIG. 6 maintains the purpose of having a cold region being reflected by surface 48 and filter 50 onto detector array 20 without introducing a spurious ghost pattern onto the image acquired by detector array 20 due to the non-uniform emissivity of the detector plane.

Like device 10, device 10' may optionally include one or more baffles to prevent stray emission from the environment from reaching detector array 20.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A device for imaging infrared radiation from a scene, the radiation including a plurality of wavelength bands, the device comprising:
 (a) a detector of the infrared radiation;
 (b) an enclosure, for keeping said detector at an operating temperature thereof, and including a window that is transparent to the infrared radiation;
 (c) an optical system, outside of said enclosure, for focusing the infrared radiation through said window onto said detector;
 (d) a spectral filter; and
 (e) a mechanism for positioning said spectral filter substantially at a single intermediate focal plane for all the wavelength bands, said single intermediate focal plane being between a first optical component of said optical system and a second optical component of said optical system,
wherein said spectral filter includes a plurality of filters, and wherein said mechanism is operative to alternately and reversibly position each of said filters at said intermediate focal plane.

2. The device of claim 1, wherein said spectral filter has a negligible emissivity at wavelengths to which said detector is sensitive.

3. The device of claim 2, wherein said spectral filter is an interference filter.

4. The device of claim 1, wherein said spectral filter is a circular variable filter.

5. The device of claim 1, wherein said spectral filter is a linearly variable filter.

6. The device of claim 1, wherein said mechanism keeps said spectral filter fixed in place at said intermediate focal plane.

7. The device of claim 1, further comprising:
  (f) at least one baffle for shielding said detector from stray radiation.

8. The device of claim 1, wherein said detector includes a plurality of detector elements.

9. The device of claim 1, wherein said optical system is telecentric, with respect to an image space of said optical system, at said intermediate focal plane.

10. A device for imaging infrared radiation from a scene, comprising:
  (a) a detector of the infrared radiation;
  (b) an enclosure, for keeping said detector at an operating temperature thereof, and including a window that is transparent to the infrared radiation;
  (c) a cold shield, within said enclosure, between said window and said detector; and
  (d) an optical system, outside of said enclosure, for focusing the infrared radiation through said window onto said detector, and including:
    (i) at least one optical element, and
    (ii) on a surface of one of said at least one optical element, a filter made of a material different from said one optical element and having a defocusing relationship to said detector, wherein said one optical element is a closest optical element to said window, and wherein said surface of said one optical element, whereon said filter is, is a closest surface of said one optical element to said window, and wherein said surface of said one optical element, whereon said filter is, is concave towards said window and has a radius of curvature substantially equal to a distance of said surface from an aperture of said cold shield.

11. The device of claim 10, wherein said filter has a negligible emissivity at wavelengths to which said detector is sensitive.

12. The device of claim 11, wherein said filter is an interference filter.

13. The device of claim 10, further comprising:
  (e) at least one baffle for shielding said detector from stray radiation.

14. The device of claim 10, wherein said detector includes a plurality of detector elements.

15. The device of claim 10, wherein said filter is spaced apart from said window.

16. The device of claim 10, wherein said filter has a narrower passband, for the infrared radiation, than said one optical element.

17. The device of claim 1, wherein each said filter has a different respective passband.

18. The device of claim 1, wherein said spectral filter is selected from the group consisting of a circular variable filter and a linear variable filter, and herein said mechanism is operative to move said filter in said intermediate focal plane to select a desired transmitted wavelength of the infrared radiation.

19. The device of claim 1, wherein said spectral filter has a negligible emissivity at a wavelength to which said detector is sensitive, and wherein said spectral filter is selected from the group consisting of a circular variable filter and a linearly variable filter, and wherein said detector includes a plurality of detector elements, and wherein said optical system is telecentric, with respect to an image space of said optical system, said intermediate focal plane.

\* \* \* \* \*

UNITED STATES PATENT AND TRADEMARK OFFICE
CERTIFICATE OF CORRECTION

PATENT NO.        : 9,121,760 B2
APPLICATION NO.   : 12/853319
DATED             : September 1, 2015
INVENTOR(S)       : Dario Cabib et al.

Page 1 of 1

It is certified that error appears in the above-identified patent and that said Letters Patent is hereby corrected as shown below:

In the claims:

Column 10 Claim 18 line 30 should be corrected as follows:
Change
    -- and herein --
    to
    "and wherein"

Signed and Sealed this
Twelfth Day of July, 2016

Michelle K. Lee
*Director of the United States Patent and Trademark Office*